Sept. 12, 1939.　　　A. KANTROWITZ　　　2,172,387
CASTERING WHEEL
Filed Nov. 29, 1937　　　2 Sheets-Sheet 1
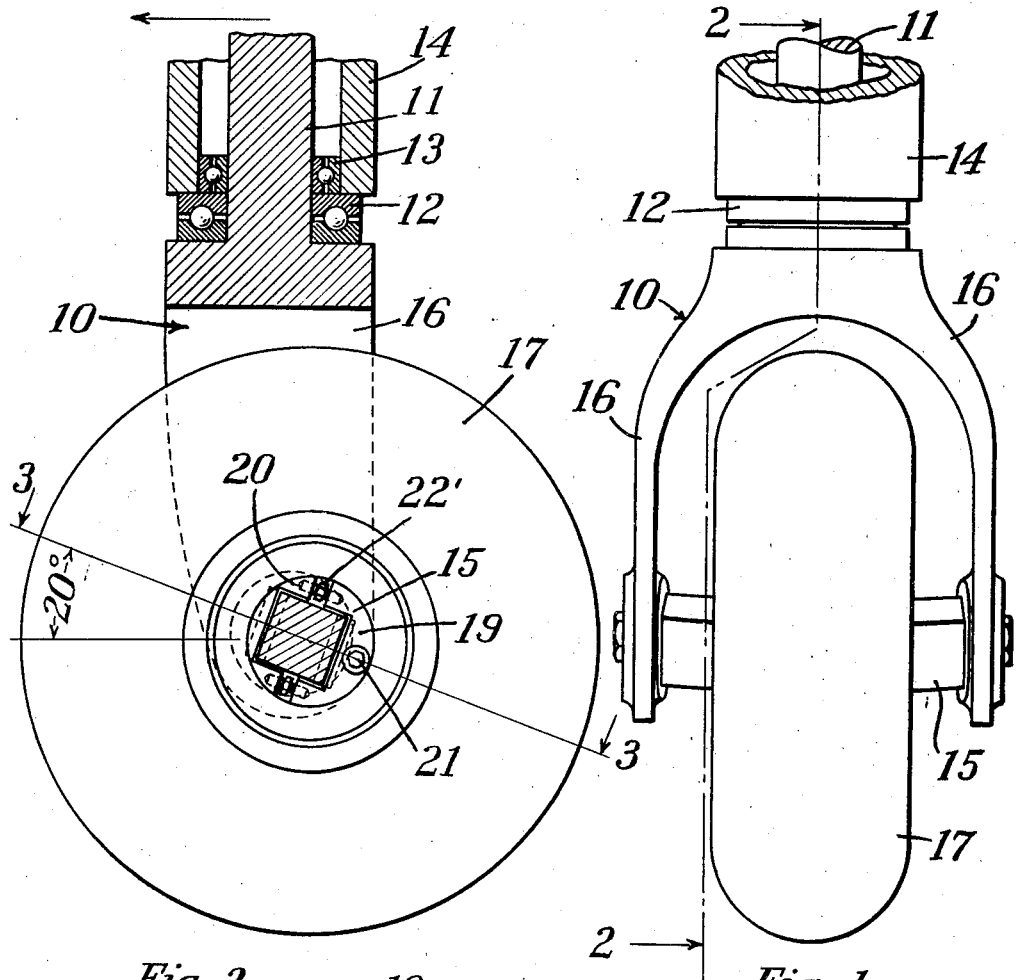
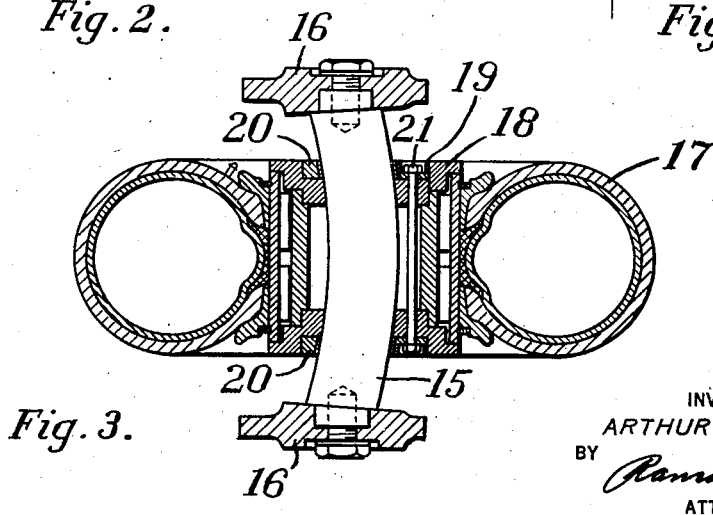
INVENTOR
ARTHUR KANTROWITZ
BY
ATTORNEY Sept. 12, 1939.   A. KANTROWITZ   2,172,387
CASTERING WHEEL
Filed Nov. 29, 1937   2 Sheets-Sheet 2
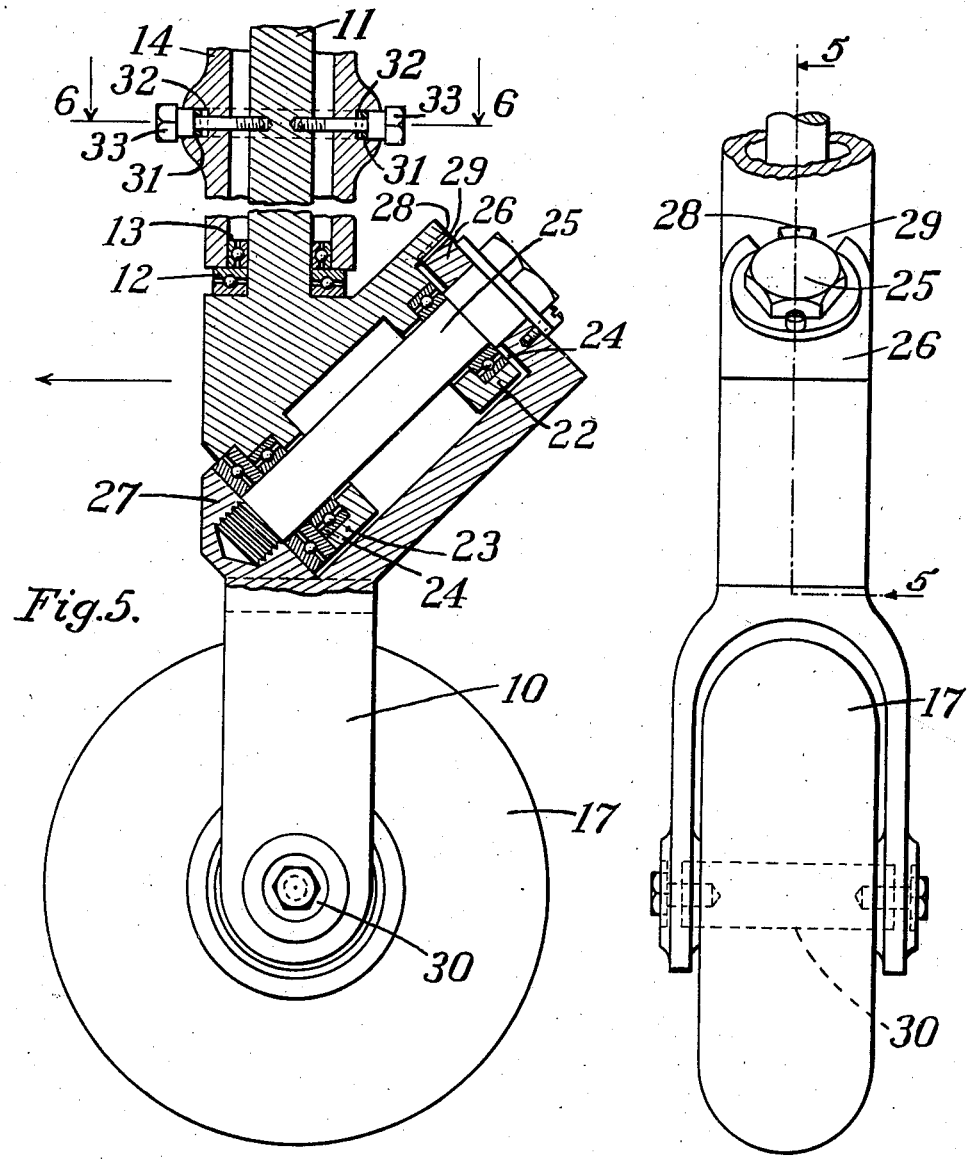
INVENTOR
ARTHUR KANTROWITZ
BY
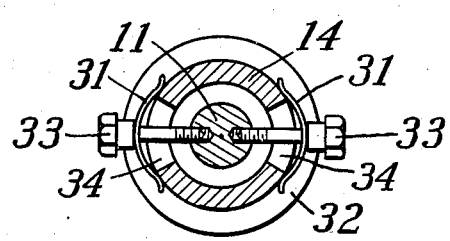
ATTORNEY Patented Sept. 12, 1939

2,172,387

UNITED STATES PATENT OFFICE 2,172,387

CASTERING WHEEL

Arthur Kantrowitz, New York, N. Y.

Application November 29, 1937, Serial No. 177,069

11 Claims. (Cl. 16—21)

(Granted under the act of March 3, 1883, as amended April 30, 1928; 370 O. G. 757)

This invention relates to castering wheels and it has particular relation to castering wheels for aircraft and other vehicles.

Heretofore, one of the objections to castering wheels has been the tendency for them to oscillate or shimmy. This shimmy is a self-excited oscillation occurring in elastic or rubber tired castering wheels and produced in the following manner: Let it be supposed that the wheel is set at an angle to the direction of motion of the vehicle by an irregularity in the ground. If the tire does not skid when the vehicle moves forward, the bottom must deflect laterally, since there is a component of motion in this direction. Considering the vehicle to be still moving forward slowly, when the tire has deflected laterally it will tend to straighten the wheel. When this has occurred, the tire will still be deflected and consequently, the wheel continues to turn and eventually overshoots until it finally reaches an angle approximately equal and opposite in sign to the original angle at which the wheel was set. This effect is repeated and the oscillations continue at approximately the same amplitude as long as the vehicle moves slowly. If the vehicle should move more rapidly, the oscillations will occur more frequently and the moment of inertia about the castering spindle causes an appreciable inertia torque. This inertia torque makes the angle of the wheel lag behind the phase relationship to the deflection of the tire which it formerly had and gives the tire more time to deflect. Thus, the tire deflects more than before and on the next one-half cycle the wheel turns further with the result that energy is continually fed into the oscillation. This energy input is frequently sufficient to overcome whatever energy losses may be present in the system. When this occurs the oscillations increase in amplitude and may impose severe oscillatory loads on the vehicle. Thus, it will be apparent that the interaction of lateral deflection of the tire with the angular or rotary spindle motion is the cause of the shimmy.

One of the objects of the present invention is to prevent the objectionable shimmy above explained by providing a construction in which the wheel is permitted to move a limited distance laterally relative to the axis of the castering spindle. Thus the tire deflection is partially neutralized continually and its interaction with the angular motion can be reduced enough to prevent shimmy.

With these and other objects in view, as well as other advantages which may be incident to the use of the improvements, the invention consists of the parts and combinations thereof hereinafter set forth and claimed, with the understanding that the several necessary elements constituting the same may be varied in proportion and arrangement without departing from the nature and scope of the invention as defined in the appended claims.

In order to make the invention more clearly understood there are shown in the accompanying drawings means for carrying the invention into practical effect, without limiting the improvements in their useful application to the particular construction, which, for the purpose of explanation, have been made the subject of illustration.

In the accompanying drawings:

Fig. 1 is a rear elevational view of a castering wheel constructed in accordance with the invention;

Fig. 2 is a view partly in side elevation and partly in vertical section on line 2—2 of Fig. 1;

Fig. 3 is a transverse sectional view taken on line 3—3 of Fig. 2;

Fig. 4 is a rear elevational view of another form of castering wheel embodying the invention;

Fig. 5 is a view partly in side elevation and partly in vertical section on line 5—5 of Fig. 4; and Fig. 6 is a transverse sectional view taken on line 6—6 of Fig. 5.

Referring to the drawings, and particularly to Figs. 1 to 3 thereof, a castering wheel constructed in accordance with the present invention is shown as compriisng a yoke 10 provided with a vertical spindle 11 which is rotatably mounted by means of step bearings 12 and lateral thrust bearings 13 in a tubular post 14 carried by the fuselage of the aircraft. A shaft 15, preferably square in cross-section, is non-rotatably mounted at its ends in the legs 16 of the yoke and curves rearwardly and downwardly to give a crown effect thereto. A wheel 17 of any preferred type, is rotatably mounted on bearings 18 (Fig. 3) which are tied together by a bolt 21 and which are slidably mounted on the shaft 15 in spaced relation to the legs 16 of the yoke. It will be apparent from this construction that the wheel 17 is free to move laterally on the shaft 15 a limited amount without transmitting any motion to the yoke 10 or fuselage, but due to the curvature of the axle there is a constant tendency for the wheel to centralize itself between the legs 16 of the yoke. This free lateral movement of the wheel 17 and bearings 18 on the shaft 15 is, however, restrained or dampened by means of braking devices disposed on opposite sides of the wheel. Each of the devices comprises two semicircular shoes 19 and 20, the former being secured to the adjacent bearing 18 on one side of the shaft 15 by means of the bolt 21 which ties the halves of bearing 18 together, and the latter being adjustably secured to the shoe 19 for frictional contact with the shaft 15 by bolts 22' having right and left screw threaded ends engaging the shoes 19 and 20 (Fig. 2).

In Figs. 4 and 5 there is shown another embodiment of the invention in which the lower end of the spindle 11 is formed with a pair of spaced ears 22 and 23 carrying bearings 24 in which a pivot pin 25 is rotatably mounted at an angle to the horizontal. The yoke 10 is also formed with a pair of ears 26 and 27 which are mounted on the outer ends of the pivot pin 25. In the embodiment illustrated, the pin 25 is in the form of a bolt, the lower end of which is threaded into the lower or forward ear 27 of the yoke 10. This construction forms a hinge or knuckle joint between the wheel and the spindle for permitting the wheel and yoke to swing laterally about the pin 25 as a pivot. This lateral swinging movement is limited by a lug or projection 28 formed on the upper ear 22 of the spindle which projects into a slot 29 provided in the upper ear 26 of the yoke. In this construction the wheel is mounted on a straight axle 30 and does not move laterally thereon, as in the structure shown in Figs. 1 to 3.

The rotative movement of the spindle 11 in the structures shown in all of the figures is preferably restrained by means of a brake of any suitable type herein shown as comprising springs 31 (Fig. 6) arranged on opposite sides of the post 14 and disposed within a groove or channel 32 formed therein. The springs 31 are held in position and at the desired tension by bolts 33 threaded into the spindle 11 and projecting through slots 34 formed in the post. The rotative movement of the spindle 11 in all of the figures is limited in any suitable way herein shown as being limited by the bolts 33 abutting the ends of the slots 34.

From the foregoing it will be apparent that by means of the present invention there is provided a castering wheel which, except for the action of the braking means, is freely movable in a lateral direction relatively to the post 14, thus, when properly adjusted, eliminating all tendency for the objectionable "shimmy" heretofore encountered.

Other modifications and changes in the proportion and arrangement of the parts, other than those shown, may be made by those skilled in the art, without departing from the nature and scope of the invention, as defined in the appended claims.

The invention described herein may be manufactured and/or used by or for the Government of the United States of America for governmental purposes without the payment of any royalties thereon or therefor.

I claim:

1. A castering wheel for aircraft and other vehicles comprising a spindle adapted to be mounted in a bearing on the aircraft for rotation about an axis disposed in a substantially longitudinally extending vertical plane; a yoke member carried by said spindle; a downwardly curved axle fixed at its ends in said yoke member; and a castering wheel of less width than said yoke member rotatably mounted on said axle for free longitudinal movement thereon.

2. A castering wheel for aircraft and other vehicles comprising a spindle adapted to be mounted in a bearing on the aircraft for rotation about a substantially vertical axis; a yoke member carried by said spindle; a rearwardly and downwardly curved axle fixed at its ends in said yoke member; and a castering wheel of less width than said yoke member rotatably mounted on said axle for free longitudinal movement thereon.

3. A castering wheel for aircraft and other vehicles comprising a spindle adapted to be mounted in a bearing on the aircraft for rotation about a substantially vertical axis; a yoke member carried by said spindle; a downwardly curved axle of rectangular cross-section fixed at its ends in said yoke member; non-rotary slide bearings mounted on said axle; and a castering wheel of less width than said yoke member rotatably mounted on said slide bearings, said wheel and bearings being free to move laterally along said axle within said yoke member.

4. A castering wheel for aircraft and other vehicles comprising a spindle adapted to be mounted in a bearing on the aircraft for rotation about a substantially vertical axis; a yoke member carried by said spindle; a rearwardly and downwardly curved axle of rectangular cross-section fixed at its ends in said yoke member; non-rotary slide bearings mounted on said axle; and a castering wheel of less width than said yoke member rotatably mounted on said slide bearings, said wheel and bearings being free to move laterally along said axle within said yoke member.

5. A castering wheel for aircraft and other vehicles comprising a spindle adapted to be mounted in a bearing on the aircraft for rotation about a substantially vertical axis; a yoke member carried by said spindle; a rearwardly and downwardly curved axle of rectangular cross-section fixed at its ends in said yoke member; non-rotary slide bearings mounted on said axle; and a castering wheel of less width than said yoke member rotatably mounted on said slide bearings, said wheel and bearings being free to move laterally along said axle within said yoke member.

6. A castering wheel for aircraft and other vehicles comprising a spindle adapted to be mounted in a bearing on the aircraft for rotation about a substantially vertical axis; a yoke member carried by said spindle; a downwardly curved axle of rectangular cross-section fixed at its ends in said yoke member; non-rotary slide bearings mounted on said axle; a castering wheel of less width than said yoke member rotatably mounted on said slide bearings, said wheel and bearings being free to move laterally along said axle within said yoke member; and means for dampening the lateral movement of said wheel.

7. A castering wheel for aircraft and other vehicles comprising a spindle adapted to be mounted in a bearing on the aircraft for rotation about a substantially vertical axis; a yoke member carried by said spindle; a rearwardly and downwardly curved axle of rectangular cross-section fixed at its ends in said yoke member; non-rotary slide bearings mounted on said axle; a castering wheel of less width than said yoke member rotatably mounted on said slide bearings, said wheel and bearings being free to move laterally along said axle within said yoke member; and means for yieldably opposing the lateral movement of said wheel.

8. A castering wheel for aircraft and other vehicles comprising a yoke member adapted to be mounted on a bearing on the aircraft for rotation about a substantially vertical axis and for lateral swinging movement about an axis extending at an angle upwardly and rearwardly with respect to the axis of rotation of said yoke member in said bearing, and a wheel rotatably mounted on said yoke member.

9. A castering wheel for aircraft comprising a spindle adapted to be mounted in a bearing on the aircraft for rotation about a substantially vertical axis; a yoke member mounted on said spindle for lateral swinging movement about an axis extending at an angle upwardly and rearwardly with respect to the axis of rotation of said spindle, a wheel rotatably mounted on said yoke member in said bearing, and means for limiting the lateral swinging movement of said yoke member.

10. A castering wheel for aircraft and other vehicles comprising a spindle adapted to be mounted in a bearing on the aircraft for rotation about a substantially vertical axis; a yoke member mounted on said spindle for lateral swinging movement about an axis extending at an acute angle upwardly and rearwardly with respect to the axis of rotation of said spindle, and a wheel rotatably mounted on said yoke member.

11. A castering wheel for aircraft and other vehicles comprising a spindle adapted to be mounted in a bearing on the aircraft for rotation about a substantially vertical axis; a yoke member mounted on said spindle for lateral swinging movement about an axis extending at an acute angle upwardly and rearwardly with respect to the axis of rotation of said spindle, a wheel rotatably mounted on said yoke member, and means for limiting the lateral swinging movement of said yoke member.

ARTHUR KANTROWITZ.